Jan. 17, 1950     W. H. McCOLLISTER     2,495,117
FLUID PRESSURE ACTUATED TIRE BEAD BREAKING LEVER
Filed Nov. 15, 1945     3 Sheets—Sheet 1
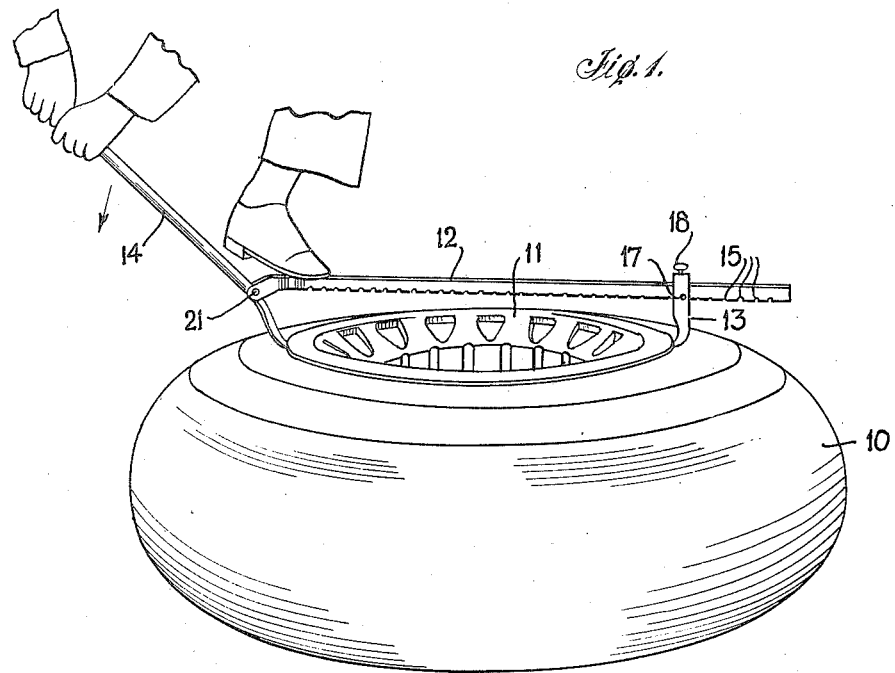
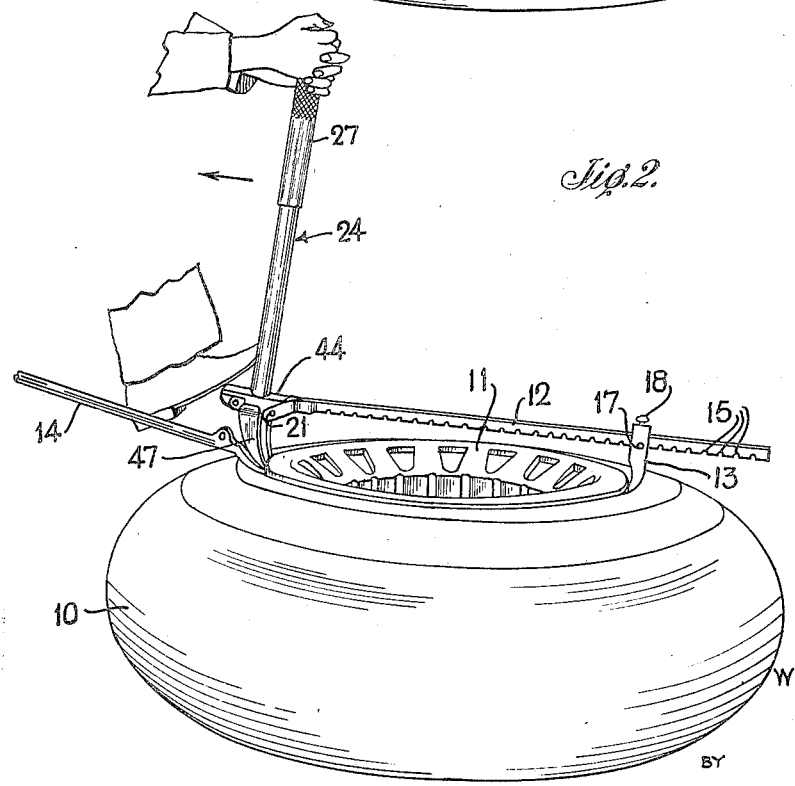
INVENTOR
WILLIAM H. McCOLLISTER
BY
ATTORNEYS

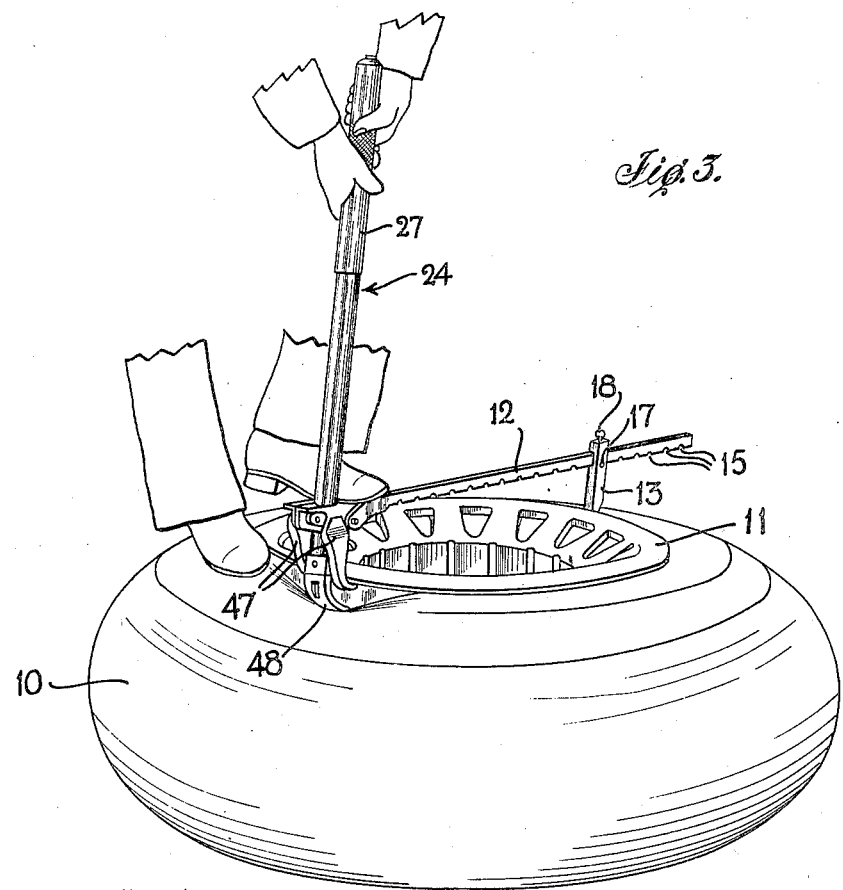
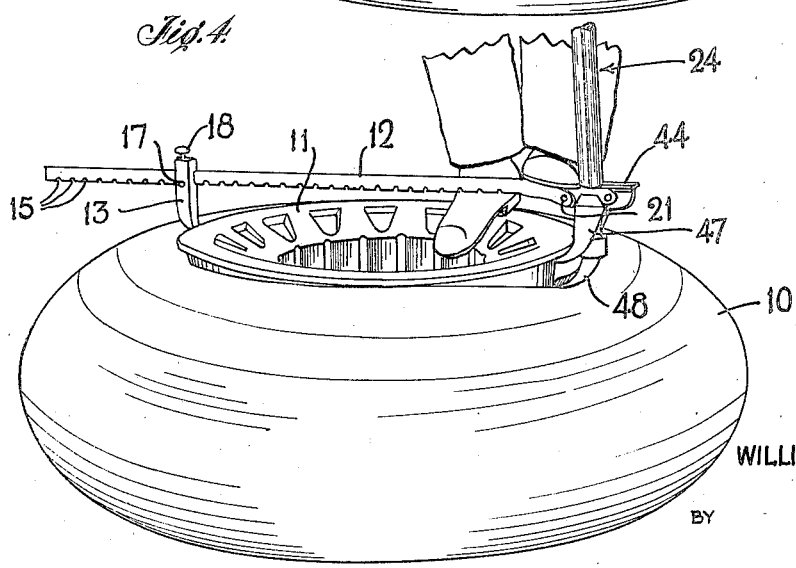

Jan. 17, 1950 W. H. McCOLLISTER 2,495,117
FLUID PRESSURE ACTUATED TIRE BEAD BREAKING LEVER
Filed Nov. 15, 1945 3 Sheets-Sheet 3
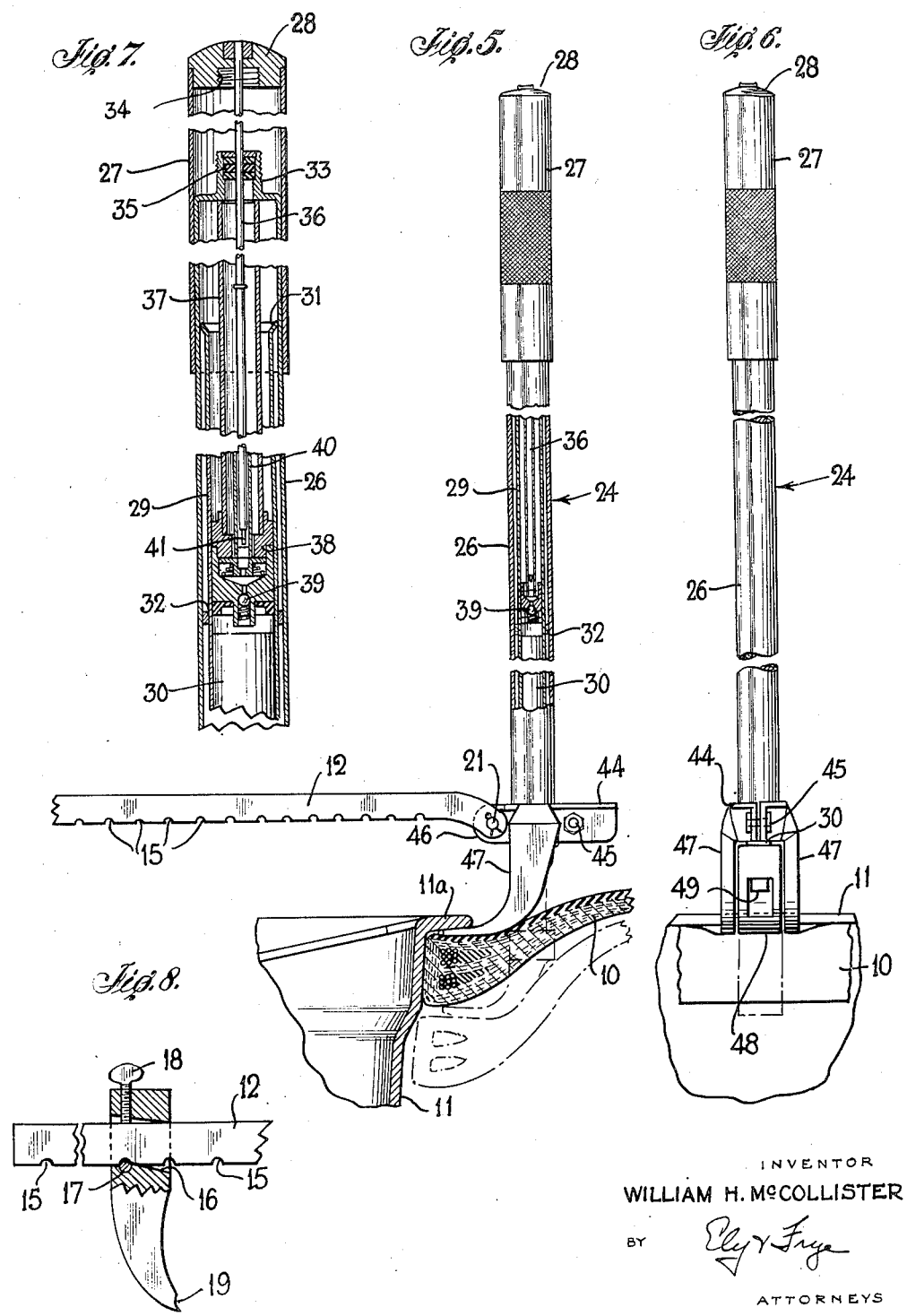
INVENTOR
WILLIAM H. McCOLLISTER
BY
ATTORNEYS Patented Jan. 17, 1950

2,495,117

UNITED STATES PATENT OFFICE 2,495,117

FLUID PRESSURE ACTUATED TIRE BEAD BREAKING LEVER

William H. McCollister, Akron, Ohio, assignor to The Firestone Tire & Rubber Company, Akron, Ohio, a corporation of Ohio Application November 15, 1945, Serial No. 628,871

1 Claim. (Cl. 157—1.17)

This invention relates to tire dismounting tools, and more especially it relates to tools that are utilized during the operation of removing tires of relatively large size from the rims on which they are mounted.

The tool is of especial utility for removing the large tires employed for earth-moving equipment, and for the landing wheels of large bomber and transport aircraft. Such tires may comprise as many as ten fabric plies, and are relatively stiff. They frequently become rusted to the wheel rims, or become fused thereto due to heat generated during braking, all of which conditions contribute to make the dismounting of the tires from the rims a difficult matter. In some instances sledge hammers have been employed to initiate separation of the tires from their rims, and damage to tires has been extensive due to broken tire beads.

The chief objects of this invention are to provide in an improved manner for the dismounting of tires from their rims; to avoid damage to tires during the dismounting thereof; reduce the time required to dismount a tire from a rim; and to reduce the manual effort required. More specifically, the invention aims to utilize the advantages of hydraulics in the dismounting of tires from rims. Other objects will be manifest as the description proceeds.

Of the accompanying drawings:

Fig. 1 is a perspective view of the initial step of removing a tire from a rim, said view showing some of the elements of the improved tire dismounting tool of the invention, and a tire mounted upon a rim;

Fig. 2 is a view of the succeding tire removing operation, showing all of the elements of the improved tire dismounting tool;

Figs. 3 and 4 show successive succeeding steps of loosening a tire from the entire periphery of a rim on which it is mounted;

Fig. 5 is a side elevation of a manually operable hydraulic jack constituting the dynamic element of the improved tire dismounting tool, and a fragmentary portion of a tire with which it is operatively engaged, parts being broken away and in section;

Fig. 6 is a rear elevation thereof;

Fig. 7 is a fragmentary diametric section on a larger scale, of the hydraulic jack; and Fig. 8 is a fragmentary sectional detail of an anchor member that constitutes one of the elements of the tool of the invention.

Referring to the drawings, particularly Fig. 1 thereof, there is shown a tire 10 that is mounted upon a tire rim 11, and a tool for effecting a slight separation of a bead portion of the tire from the rim-flange against which it bears, which separation is of sufficient extent to enable the work-engaging portions of a hydraulic jack to be inserted between the said tire bead and rim-flange. Said tool comprises an elongate bar 12 having an anchor member 13 mounted adjacent to one end thereof, and a manually operable lever 14 pivotally mounted upon the opposite end thereof. The anchor member 13 is adjustably mounted on bar 12 to adapt the tool to tire rims of various diameters. To this end the bottom margin of the bar 12 is formed with a multiplicity of transverse grooves 15, 15. As best shown in Fig. 8, the anchor member 13 is formed with a through slot or aperture 16 through which the bar 12 extends, said aperture being substantially larger than the bar. A cylindrical stud 17 extends transversely through the anchor 13, a portion of said stud being located within the slot 16 and adapted to seat within a groove 15 of the bar 12. A thumb screw 18 is threaded through the top of the anchor and into slot 16, said thumb screw adapted to engage the top surface of the bar 12 and thus to draw the stud 17 firmly into engagement with a groove 15, whereby the anchor is secured against movement longitudinally of the bar, yet readily may be moved to a different position, when desired, simply by loosening of the thumb screw. The lower end of the anchor member is formed with an arcuate recess 19 adapted for engagement with the edge of a marginal rim-flange 11a of the tire rim 11, so that the anchor will not slip therefrom under operational strains.

As previously stated, the lever 14 is pivotally mounted upon that end of the bar 12 that is remote from the anchor member 13, the said end of the bar being forked, and the lever being received within the fork and mounted upon a pivot-pin 21 extending thereacross. The latter may be quickly removed, when desired, to permit removal of the lever. Lever 14 is a lever of the first class, its long arm constituting a hand grip by which it is manipulated, its short arm having a work-engaging flattened nose (not shown) adapted to be forced between the bead portion of tire 10 and the rim-flange 11a to initiate separation of the tire and rim.

In operation, the previously described tool is positioned with the nose of anchor 13 in engagement with rim-flange 11a, and the nose of lever 14 at the juncture of said tire bead and rim-flange, at a diametrically opposite point of the latter, as is most clearly shown in Fig. 1. The operator bears down upon the hand-grip portion of the lever 14, and by so doing forces the nose portion thereof under the marginal rim-flange 11a, between the latter and the tire bead, thereby effecting a modicum of separation thereof. This separation, though slight, is sufficient to admit the work-engaging portions of a hydraulic jack, the latter being designated as a whole by the numeral 24. The jack 24 is mounted in work-engaging position beside the lever 14, before the lever is withdrawn from operative association with the work. After the jack 24 is mounted in operative engagement with the work, as described, the lever 14 is disconnected from the bar 12 by the withdrawal of the pivot pin 21, the said bar thereafter being swung laterally and pivotally connected to the hydraulic jack by means of the same pivot pin 21, as is clearly shown in Fig. 2. Then by pulling the upper end of the hydraulic jack in the direction indicated by the arrow in Fig. 2, the jack will pivot about its fulcrum on the pin 21 and the work-engaging portion at the lower end thereof will be forced to fullest extent into the space between the rim-flange 11a and the bead of tire 10. The lever 14 may then be removed.

The hydraulic jack 24 is shown in greater detail in Figs. 5 to 7 to which attention now is directed. The fundamental elements of the jack are not a part of the present invention, and for this reason require only a superficial description. As is best shown in Fig. 7, the jack comprises an outer tubular shell 26, a cap-like shell 27 telescoped thereon at the upper end thereof and having a top closure 28, and a tubular piston 29 telescoped within the shell 26 at the bottom thereof, the lower end of said piston being provided interiorly with a cylindrical closure member 30 that projects from the bottom thereof. The piston 29 is longitudinally reciprocable relatively of the shell 26, and is spaced from the wall of the latter except for a terminal flare 31 at its upper end and a spacer collar 32 at an intermediate region. The upper end of the shell 26 is formed with a reduced neck 33 that is exteriorly threaded, and is receivable in an interiorly threaded axial recess 34 formed on the under side of the closure 28, when the shell 27 is telescoped with the shell 26 to maximum extent, for a purpose presently to be explained. The neck 33 comprises a stuffing box 35 through which extends a plunger 36 that is affixed at its upper end to the closure 28, coaxially of the recess 34. Mounted interiorly of the piston 29 and shell 26, and secured at its upper end to top of the latter is a tubular fluid reservoir 37 that is spaced from the wall of the said piston, and carries at its lower end an axially perforate head 38 that includes a spring-pressed ball valve 39 therein, the piston being slidable longitudinally relatively of said head. The head 38 carries a relatively short, upwardly extending sleeve 40 that constitutes a pressure chamber, the lower end portion of the plunger 36 moving into and out of said pressure chamber as the shell 27 is reciprocated upon the shell 26. Thus it will be seen that manual reciprocation of the shell 27 will force fluid past the valve 39 and into the chamber of the piston 29, above the bottom closure 30 and below the head 38, whereby said piston is projected from the shell 26. For returning the piston to retracted inoperative position, the plunger 36 is formed at its lower end with a reduced nose portion 41 adapted to engage with and unseat the valve 39 and thereby to enable return of fluid from the piston chamber.

During normal operation the plunger-nose 41 does not meet the valve 39, but will do so when the shell 27 is fully telescoped with the shell 26, and rotated so that the neck portion 33 is threaded into the recess 34 in the closure 28.

The foregoing structure of the hydraulic jack is a standard article of commerce, and no claim to the jack per se is made herein.

Mounted upon the lower end portion of the outer shell 26 of the hydraulic jack 24 is a split clamp 44 that is secured in place by a bolt 45. Said clamp is formed with an apertured ear 46 to which the bar 12 is pivotally connected by the pivot pin 21. Said clamp also is formed with a pair of spaced-apart claws 47, 47 that extend downwardly in parallelism from the clamp and laterally in the same direction as the ear 46. Mounted upon the projecting lower end of the piston 29 and its closure 30 is a claw 48 that is secured in place by a cap screw 49. The claw 48 is disposed between the claws 49 and is substantially the same shape as the latter so that it is in transverse alignment therewith when the piston 29 is in its retracted inoperative position, as shown in full lines in Figs. 5 and 6.

The function of the hydraulic jack is clearly shown in Figs. 3 and 4. After the claws 47, 48 of the hydraulic jack have been forced between the rim-flange 11a and the tire 10, while the jack is in retracted inoperative position as previously described, the operator turns the shell 27 to unthread the neck 33 from the recess 34, and then reciprocates said shell 27 relatively of the shell 26. This forces the plunger 29 of the jack outwardly, and since reaction of shell 26 is restrained by engagement of the claws 47 with the rim-flange 11a, the claw 48 is forcibly projected against the bead portion of the tire 10 with the result that the latter is pushed off its seat on the rim 11 as is shown in Fig. 3 and in broken lines in Fig. 5. The operator then retracts the plunger 29 to bring the claw 48 into alignment with claws 47, and shifts the position of the claws to a contiguous region of the tire whereat he repeats the operation described. Thus the loosening of the tire bead from the rim is effected progressively about the perimeter of the rim, as is shown in Fig. 4. After one of the tire beads is completely loosened from the rim, the tire and rim are turned over and the same operations employed to loosen the other bead of the tire from the rim. Thereafter the tire readily is removed from the rim in the usual manner.

The invention makes it possible for a single operator easily to remove large size tires from rims without damage to the tires. The use of the hydraulic jack multiplies the manual effort of the operator so that he is enabled to apply upwards of 3,000 pounds of pressure to a tire bead to force it off its seat on a rim. The invention makes it possible to remove tires from rims more quickly than heretofore has been possible, and achieves the other advantages set out in the foregoing statement of objects.

Modification may be resorted to without departing from the spirit of the invention, or the scope thereof as defined by the appended claim.

What is claimed is:

A tire dismounting tool of the class described comprising, an elongated bar having an anchor member slidably and adjustably mounted upon one end thereof, said anchor member being formed at its lower end with a recessed portion adapted to provide anchorage of the anchor member on the radially outer edge of a rim flange, the end of said bar opposite said anchor member being provided with bifurcated arms, a lever in the form of a hydraulic jack pivotally and detachably connected adjacent its lower end to said bifurcated arms, said hydraulic jack comprising a cylinder and a piston having a rod extending through the lower end of said cylinder, a tire bead engaging claw secured to the end of said rod, a clamp member secured to the lower end of said cylinder, said clamp member having means to effect said pivotal and detachable connection of the hydraulic jack with the bifurcated arms of said bar, spaced depending claws secured to said clamp member and straddling said bead engaging claw, said claws having normally aligned, wedge shaped end portions to enter between the rim flange and the tire bead associated therewith and means for applying manually generated fluid pressure to said claws whereby said claws are separated and thereby move the tire bead away from said flange.

WILLIAM H. McCOLLISTER.

REFERENCES CITED

The following references are of record in the file of this patent:

UNITED STATES PATENTS

| Number | Name | Date |
|---|---|---|
| 1,475,519 | Snider | Nov. 27, 1923 |
| 1,507,208 | Schlenker | Sept. 2, 1924 |
| 1,983,608 | Hand | Dec. 11, 1934 |
| 2,281,476 | Casey | Apr. 28, 1942 |
| 2,319,155 | Passanante et al. | May 11, 1943 |
| 2,367,638 | McCulloch | Jan. 16, 1945 |

FOREIGN PATENTS

| Number | Country | Date |
|---|---|---|
| 197,611 | Great Britain | May 17, 1923 |